(No Model.)

W. F. MODES.
GLASS TANK FURNACE.

No. 492,820. Patented Mar. 7, 1893.

WITNESSES
Edward L. Furrell
A. Ramel.

INVENTOR
William F. Modes
By Paul Bakewell
Atty.

UNITED STATES PATENT OFFICE.

WILLIAM F. MODES, OF STREATOR, ILLINOIS.

GLASS-TANK FURNACE.

SPECIFICATION forming part of Letters Patent No. 492,820, dated March 7, 1893.

Application filed May 26, 1892. Serial No. 434,412. (No model.)

*To all whom it may concern:*

Be it known that I, WILLIAM F. MODES, a citizen of the United States, residing at Streator, in the county of La Salle and State of Illinois, have invented certain new and useful Improvements in Glass-Tank Furnaces, of which the following is a full, clear, and exact description.

My invention relates to certain improvements, hereinafter described, in the construction of glass tank furnaces, by which means are provided: first, to cause the gas and air to come together and combustion take place at a point somewhat removed from the inlet opening into the tank; second, so that the port through which the consequent products of combustion enter the tank be so formed that the flame is directed to make contact with the material or articles being treated in the furnace; and, third, to conveniently remove the fire blocks of which the side walls of the tank are composed, and, therefore, the roof of the tank sprung from supports themselves supported in such manner as to permit this.

Figure 1:
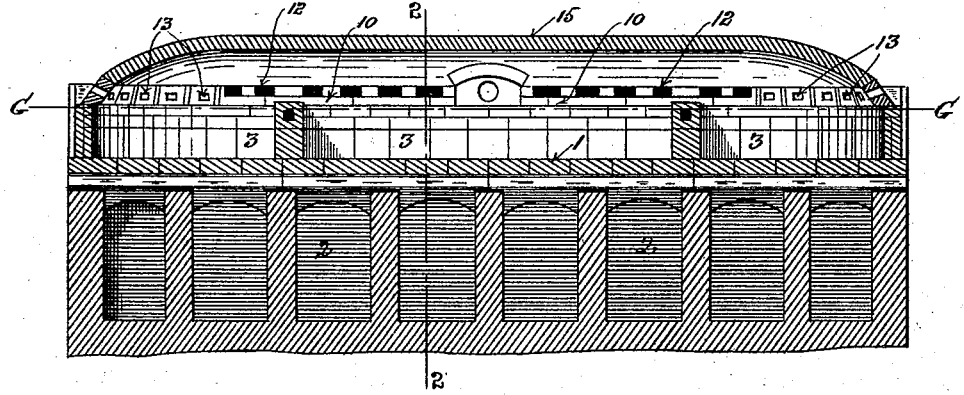
Figure 2:
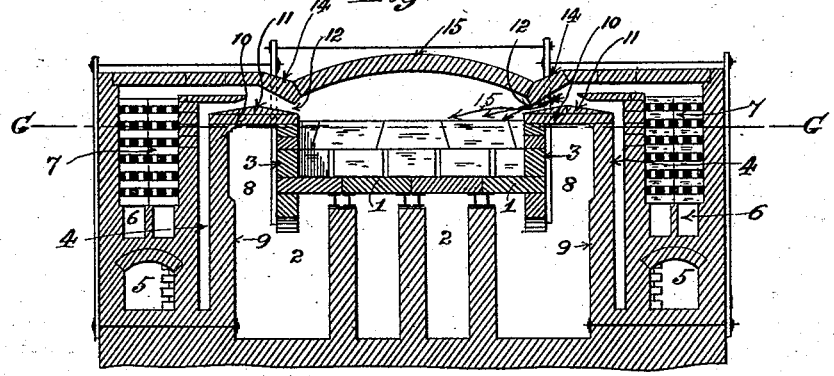

In the accompanying drawings, in which like numerals of reference denote like parts in the several figures, Figure 1 is a vertical section, taken centrally from end to end of a two-part tank furnace formed with a working out part at each end of a centrally located melting part; and Fig. 2 is a vertical cross-section of the same, taken as on the line 2—2 in Fig. 1.

In glass furnaces of the character illustrated, provision has generally been made for an air space beneath the tank and along the sides of the same; that is, as illustrated in the drawings, the floor 1 has been, in various ways, supported so as to allow an air circulation space 2 below the same, and the fire clay blocks forming the side walls 3 of the tank supported on pillars or arches independent of the brick-work 9 in which are formed the gas flues 4 and 5, air flues 6, and regenerative chambers 7, so as to provide a similar air circulation space 8 along the immediate outside of the tank, between it and the side brick-work 9. For the purpose of air circulation merely, the space 8 along the sides of the tank can be comparatively narrow and the spanning tiles 10, one end of which rests on the top of the tank side walls and the other on the side brick-work 9, comparatively short. In my improved furnace, in order, as already specified, to get at and remove the fire blocks of the side walls 3, I make this space 8 comparatively wide. The width of this space 8 is, furthermore, governed by the necessarily increased length of the spanning tiles 10, when the furnace is constructed according to my improved plan, to provide for combustion taking place at a point distantly removed from the inlet opening or port 12 into the tank, as specified.

It has been found, in practice, that the principal source of destruction to the fire blocks of which the side walls 3 are composed is the gall or spurious flux which floats on the surface of the molten glass, and, therefore, affecting the tier of blocks which are on a level corresponding to the normal level of the glass line [as G—G in the drawings] in the tank. For this reason, in my improved form of construction, I have placed the working-out holes 13 at the ends of the furnace [see Fig. 1] at a level that will, in the practical operation of the furnace, compel the glass-line G—G to be retained at a level below the lower edge of the spanning tile blocks 10. The reason of this is obvious,—If, as stated, the principal source of destruction exists in a layer of material, or materials, which floats on the surface of the glass, as a natural consequence, we should keep this level; *i. e.*, the glass-line G—G, at point below where it will affect the constructional portion of the furnace that cannot be readily removed or replaced, and, to make the furnace, as a whole, more long-lived, construct it so that the parts that are exposed to the effect of the molten glass and the destructive material carried thereon are readily and conveniently removed and replaced. It is to this end that I place, in my improved furnace, the working out holes 13 at such a height, relative to the inner exposed edges of the spanning tiles 10, on which are supported the gas and air port blocks and the skew back blocks 14 from which the arch of the roof 15 is sprung at a level requiring the glass-line G—G to be kept below the ends of the spanning tiles 10. This, as shown in Fig. 1, carries the spanning blocks 10 one tier of fire blocks higher than in the usual form of construction. This also brings the port openings 12 somewhat higher, relatively, than usual. For this reason, in connection with the fact, as herein set forth—that I desire to have the live flame make direct contact with the surface of the molten glass—the portion of the flue, leading to the ports 12 from the point at which combustion takes place, is made to open downward in general direction. In order to accomplish this, and also to direct the inflowing gas, before it meets the air, upward, toward the air, I make use of in-port blocks 11, which may, as shown, comprise two similar wedge-shaped blocks, placed in the port space, with their wide ends abutting against each other, or a single block inclined in each direction from an apex approximately midway in its length, corresponding in longitudinal section, to the two single blocks placed in juxtaposition, as shown.

Heretofore, in glass tank practice, the effort has been to so direct the inflow of gas and air that direct contact of the bright flame with the material being treated is avoided, making use of the radiated heat alone, at the same time causing combustion to take place, practically, inside the furnace. There are serious objections to this method:— First, the most intense heat is developed at some distance [in the direction of the draft] beyond where combustion takes place. Therefore, when the furnace is used on the regenerative plan, a great deal of the live heat that should be used in the furnace proper, goes to heat the checker brick-work in the regenerative chambers, for which, generally speaking, there is amply sufficient heat in the waste products; and, secondly, the active heat being wholly radiated does not nearly as efficiently take up the salt water and gall as when the cross-draft is directed to impinge on the material itself. For these reasons, I direct the flame, in my furnace, as indicated by the arrows 15 in Fig. 2, downwardly on to the molten glass and find, in practice, that the heated flame will pick up, as it were, the salt water or gall and carry the same off through the regenerative chambers 7 and out at the draft stack.

As illustrated in Fig. 1, I form the spanning tiles 10 of a width—corresponding to the length of the furnace—capable of spanning two or more of the fire blocks, of which the side walls 3 are composed below the same, in order to permit the side wall blocks to be taken out singly and replaced without disturbing the spanning tiles 10; *i. e.*, the supports from which the arch of the roof 15 is sprung.

I claim—

1. In a glass tank furnace, the combination with the tank side walls, and supplemental supporting wall parallel to and distantly placed therefrom, of tiles spanning the tops of said walls, skew back blocks supported on the tiles forming port openings, and from which blocks the roof is sprung, a roof, and inclined port blocks on the tiles in the port openings for directing the products of combustion into the tank chamber, substantially as and for the purposes described.

2. In a glass tank furnace, the combination with tank side walls and supplemental supporting walls parallel thereto and distantly placed therefrom, of regenerator walls in juxtaposition to said supplemental supporting walls forming flues, therebetween tiles spanning the tank side walls and supplemental supporting walls, skew back blocks forming port openings over the tank side walls and regenerative furnaces near the upper end of the regenerator walls substantially as described.

3. In a glass tank furnace, the combination with the tank side walls, of skew back blocks forming tapering ports, port blocks formed with opposite downwardly inclined faces forming the bottom of the port, and gas and air flues leading thereto, whereby the air is directed downwardly into the tank chamber, and the gas striking the advance inclined face of the port block is directed upwardly where it meets the air, thereby causing combustion to take place before it reaches the tank chamber, substantially as described.

4. In a glass tank furnace, the combination with a tank side wall, of a supplemental supporting wall, parallel to and distinctly-placed therefrom a regenerative furnace, the wall of which forms a gas flue therebetween and the supplemental supporting wall, tiles spanning the tank side walls and the supplemental supporting wall, skew back blocks on said tiles forming tapering ports, and port blocks inclined from about their middle downwardly in opposite directions, whereby the air from the regenerative furnace is deflected downwardly by the skew back blocks, and the gas deflected upwardly by coming in contact with the advance face of the port blocks, substantially as described.

5. In a glass tank furnace, the combination with the tank side walls, of skew back blocks supported thereon and forming induction ports with downwardly inclined roofs, an inport block in the bottom of said port formed with an apex and downwardly inclined faces extending from said apex, a deflector wall projecting into the port, the under surface of which is inclined upwardly to conform to the inclination of one of the faces of the inport block, and individual air and gas flues leading to said port, substantially as described.

In testimony whereof I have affixed my signature, in presence of two witnesses, this 18th day of May, 1892.

WILLIAM F. MODES.

Witnesses:
A. RAMEL,
H. K. WAGNER.